United States Patent [19]
Chen

[11] Patent Number: 6,120,065
[45] Date of Patent: Sep. 19, 2000

[54] QUICK COUPLING

[76] Inventor: Tsan-Jee Chen, 6F, No. 16, Sec. 5, NanKing East Road, Taipei, Taiwan

[21] Appl. No.: 09/275,672

[22] Filed: Mar. 24, 1999

[51] Int. Cl.$^7$ ..................................................... F16L 55/00
[52] U.S. Cl. ................................ 285/85; 285/91; 285/312
[53] Field of Search .................................. 285/84, 85, 91, 285/312

[56] References Cited

U.S. PATENT DOCUMENTS

| | | | |
|---|---|---|---|
| 3,124,374 | 3/1964 | Krapp | 285/85 |
| 5,295,717 | 3/1994 | Chen | 285/84 |
| 5,863,079 | 1/1999 | Donais et al. | 285/84 |
| 5,911,445 | 6/1999 | Lee | 285/85 |

*Primary Examiner*—Dave W. Arola
*Attorney, Agent, or Firm*—Pro-Techtor International Services

[57] ABSTRACT

An improved structure of quick coupling comprises mainly a main connecting body, press rods, stoppers and flange press portions. Each of two lateral sides of the main connecting body is extended to form a pair of flanges, which is provided with circular holes. A traverse pin is used to penetrate these two flanges and the press rod to fix the press rod at the main connecting body. When another connector is jointed to the improved quick coupling, the press rods are in parallel with the main body and meanwhile, an arc head at front end of the press rod is fastened to another connector for consolidating the combination, and the stopper in a reception cavity at front end of the press rod will insert in a circular hole that accommodating the flange press portion to ensure the press rod will not bounce up owing to pressure of flowing liquid in pipe or external vibration. When detachment of the connectors is desired, the flange press portion must be pressed firstly, so that the press rods can be pulled up to separate the jointed connectors.

1 Claim, 4 Drawing Sheets

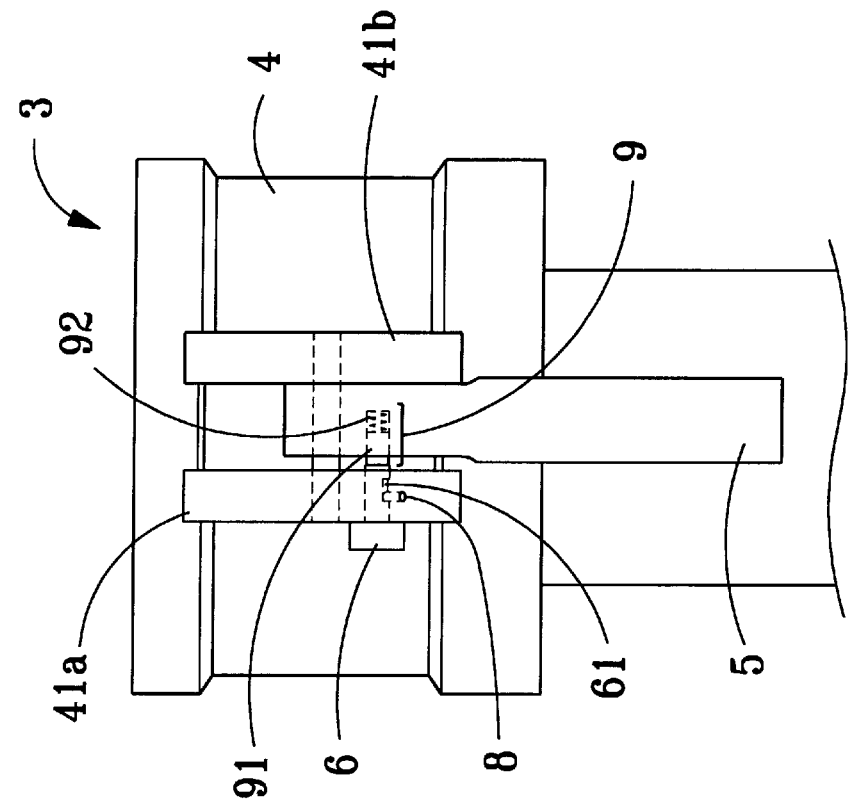
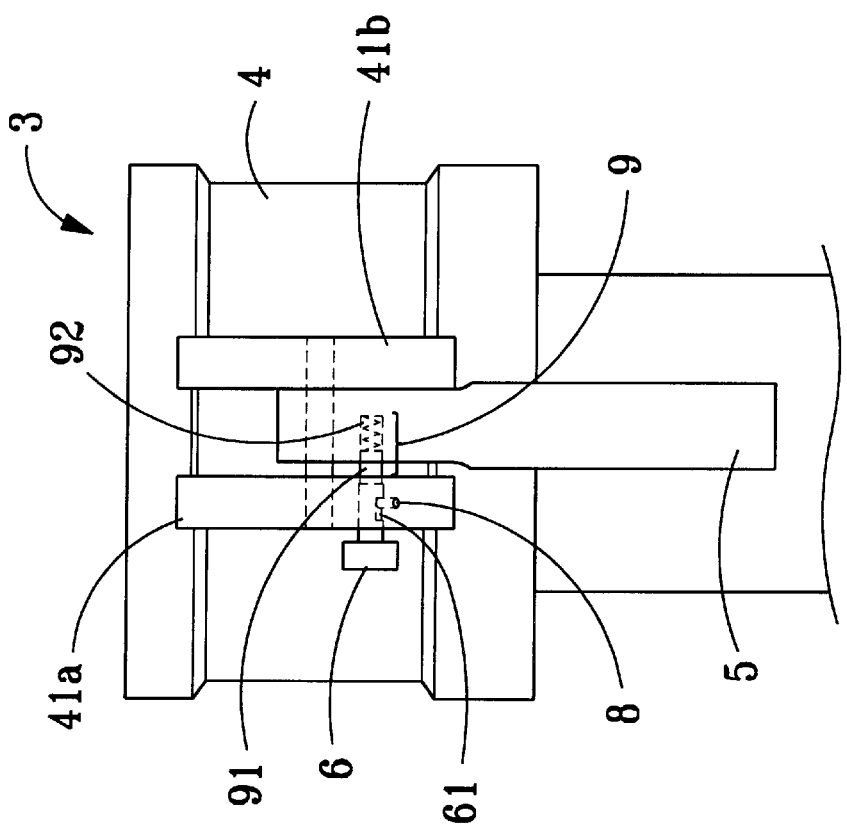

QUICK COUPLING

BACKGROUND OF THE INVENTION

1. Field of the Invention

This invention relates to a quick coupling, particularly to an improved structure of quick coupling, wherein a stopper in reception cavity at front end of a press rod will insert in a circular hole that accommodates a flange press portion when two connectors are jointed together; and the flange press portion must be pressed to detach the combined connectors.

2. Description of the Prior Art

As shown in FIGS. 1A and 1B, main connecting body 11 of a prior quick coupling is extended to form a pair of flanges 111a and 111b at each of two lateral sides, and a press rod 14 is indirectly connected to each pair of flanges 111a, 111b respectively via a traverse pin 13. The front end of the press rod 14 is in arc shape to serve as a snap fastening portion 141 when a connector 2 is collar-jointed, and an insertion pin 12 is cross-connected with the flanges 111a and 111b in series to suppress the press rod 14 in order not to let go of the same.

When connector 1 and 2 are jointed together, the press rod 14 is in parallel with the main connecting body 11, meanwhile, the snap fastening portion 141 at the front end of the press rod 14 is retained at a ring groove 21 at bottom end of the connector 2. And when separating the connector 2 from the connector 1 is desired, all a user has to do is extract the insertion pin 12 and pull up the press rods 14.

As foregoing described, the connector 2 is retained in the connector 1 merely by virtue of the snap fastening portion 141 at the front end of the press rods 14, and it is for sure after a long-term period, the snap fastening portion 141 will be affected by liquid pressure in pipe and external vibration to loosen the press rod 14 and degrade connection quality between connector 1 and 2 to result in an oozy flow of the liquid through the joint.

In view of the above-described imperfections, after years of constant effort in research, the inventor of this invention finally manages to propose an improved mechanism pertaining to the subject matter.

SUMMARY OF THE INVENTION

This invention is proposed to provide an improved structure of quick coupling, wherein two lateral press rods will clamp to the main connecting body stably in parallel without loosening despite of pressure of flowing liquid in pipe or external vibration when two connectors are jointed. The consolidated joint cannot be detached easily even after a long-term period to effectively prevent liquid in pipe from overflowing through the joint.

Another object of this invention is to provide an improved structure of quick coupling, wherein a flange press portion must be pressed for pulling up the press rods to detach combined connectors. The improved structure of quick coupling benefited with above merits comprises:

- a main connecting body with a pair of lateral flanges respectively at two opposite sides, wherein plural circular holes are formed at the flanges;
- a press rod with an arc head at its front end, a circular hole, and a reception cavity;
- a press portion having a groove;
- a stopper composed of a latch and a spring to be disposed in the reception cavity at front end of the press rod, wherein each end of the spring is put in the latch and in the reception cavity respectively.

In practical assembling, the circular hole at front end of the press rod must be in alignment with each hole in two flanges, then a traverse pin is used to penetrate the circular hole one by one, so that the press rod can be fixed movable on the main connecting body. The flange press portion is inserted in a flange of each pair of flanges at both opposite sides of the main connecting body, then a pin is plugged in a groove of the press portion to from a semi-fixed structure. Before pulling up the press rods, the flange press portion must be pressed first to squeeze the stopper out of the circular hole that accommodates the flange press portion. On the contrary, when the press rods are pushed downward to become parallel with the main connecting body, the stopper will again be inserted in the circular hole.

BRIEF DESCRIPTION OF THE DRAWINGS

For a better understanding to the present invention, together with further advantages or features thereof, at least one preferred embodiment will be elucidated below with reference to the annexed drawings in which:

FIG. 5 is a schematic view showing operation of improved structure of a quick coupling of this invention.

DETAILED DESCRIPTION OF THE PREFERRED EMBODIMENT

Figures 1A, 1B:
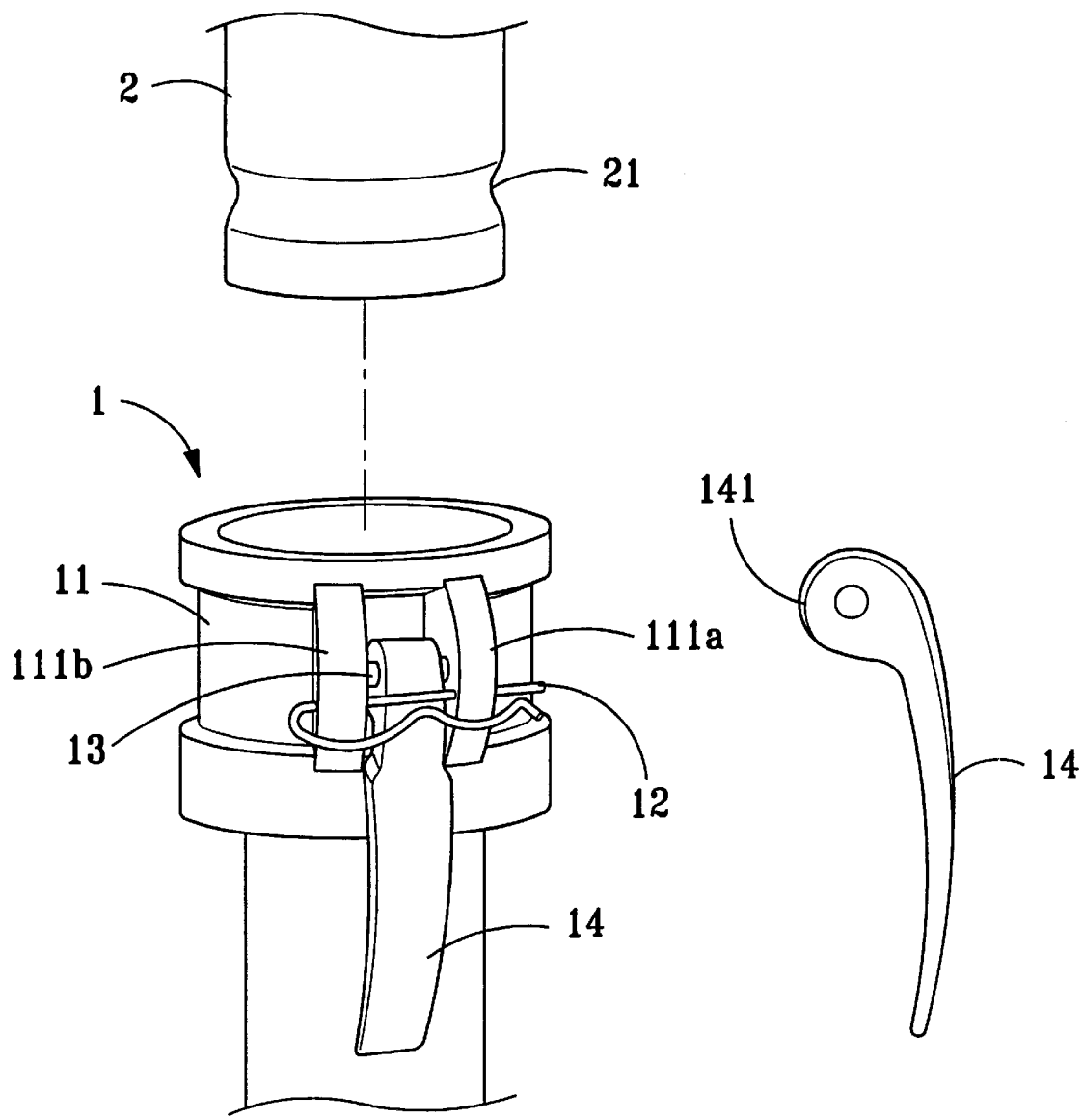
FIGS. 1A~1B are three-dimension lateral views of structure of a prior quick coupling.
Figure 2:
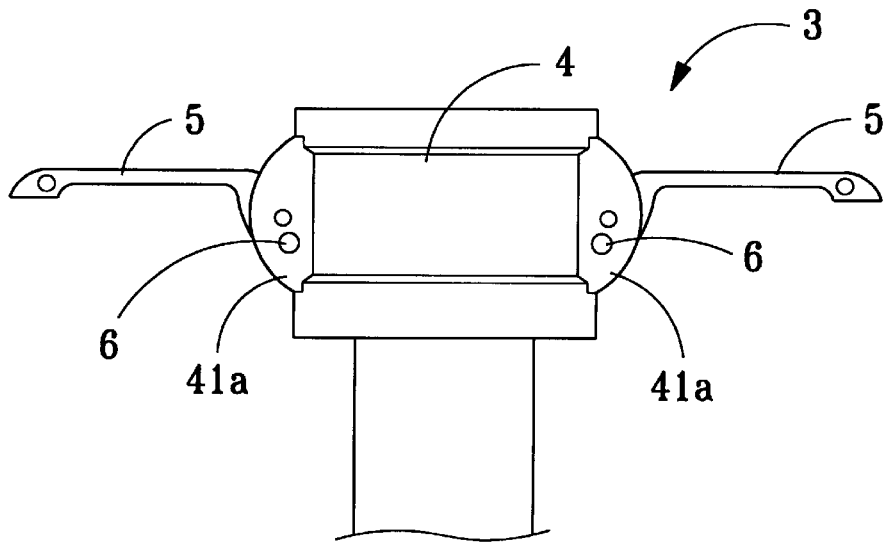
FIG. 2 is a three-dimension elevational view showing an improved structure of a quick coupling of this invention.
Figure 3:
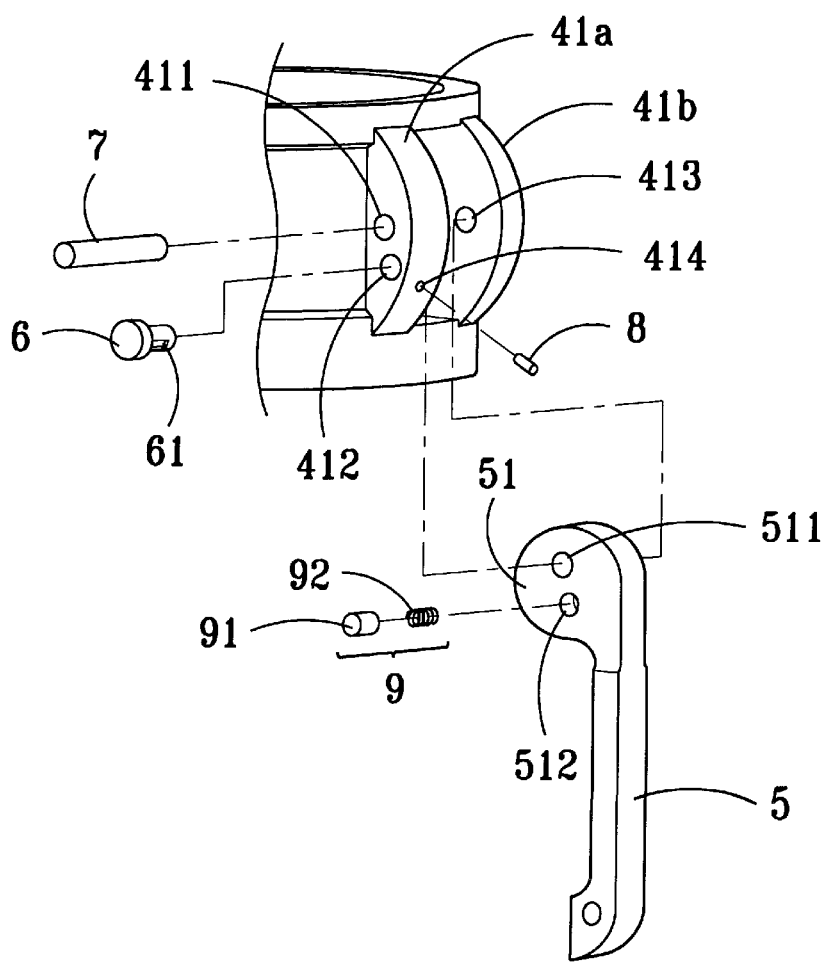
FIG. 3 is a partly exploded view showing an improved structure of a quick coupling of this invention.

As shown in FIGS. 2 and 3—a three dimension elevational view and a partly exploded view of an improved quick coupling of this invention, a connector 3 is composed of a main connecting body 4. press rods 5, flange press portion 6, and a stopper 9. A pair of flanges 41a, 41b are formed laterally to the main connecting body 4, and a circular hole 413 is arranged in the flange 41b, circular hole 411, 412, 414 are provided to the other flange 41a.

The front end of the press rod 5 is an arc head 51, wherein a circular hole 511 and a reception cavity 512 are formed. A spring 92 is put in the reception cavity 512 before a latch 91 to form the stopper 9 in the arc head 51.

The press rod 5 is combined to the main connecting body 4 by setting the circular hole 511 of the arc head 51 in alignment with the circular hole 411 and 413 between the flange 41a and 41b, then using a traverse pin 7 to penetrate circular hole 411, 511, and 413 to fix the press rod 5 at the main connecting body 4. The stopper 9 will slide on inner wall of the flange 41 a following movement of the press rod 5.

The flange press portion 6 having a groove 61 is inserted in the circular hole 412 of the flange 41a, wherein the groove 61 must be arranged to face the circular hole 414 to permit a pin 8 to be inserted in the groove 61, so that the press portion 6 is semi-fixed and movable in the circular hole 414 of the flange 41a.

Figure 4B:
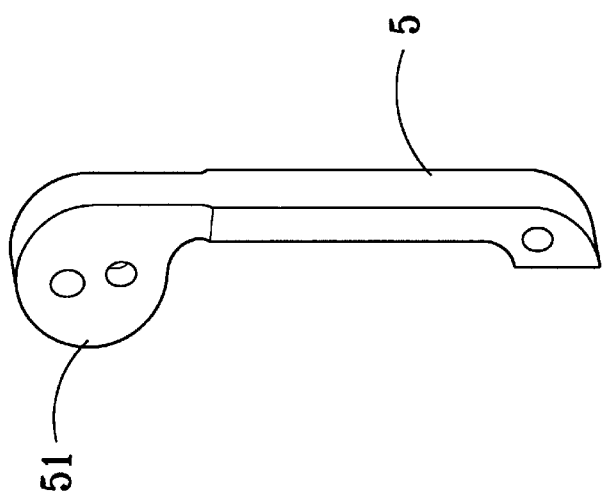
FIGS. 4A~4B are schematic views showing an improved structure of a quick coupling of this invention in connection with another connector.
Figure 4A:
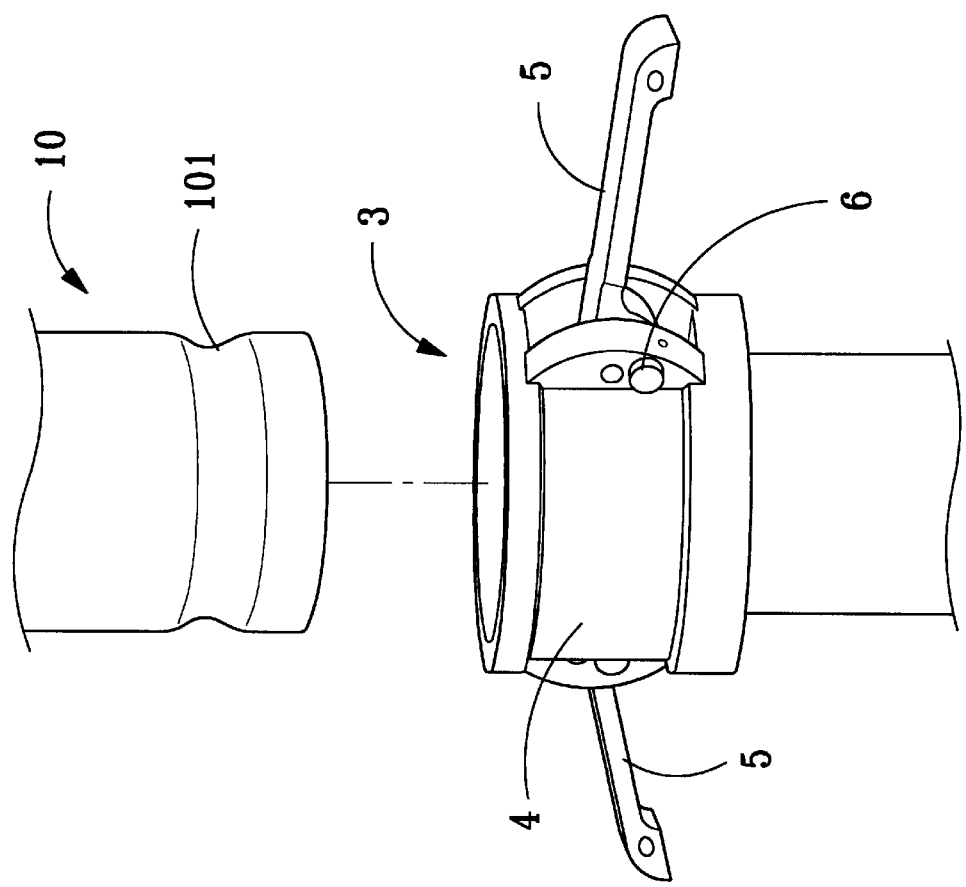

As shown in FIGS. 4A, B and FIGS. 5A, B, when a connector 10 is to be combined with another connector 3, press rods 5 have to be pulled up to permit the connector 10 to enter the connector 3, where the arc head 51 serves as a snap fastening portion. After the connector 10 enters the connector 3, a user then push the press rods 5 downward to become parallel to the main connecting body 4, the arc heads 51 of the press rods 5 will be retained in a ring groove 101 at lower end of the connector 10 to provide a tight embrace of connector 10 and 3. Meanwhile, the latch 91 in the reception cavity 512 will plug in the circular hole 412 that accommodates the press portion 6 by virtue of elastic force of the spring 92 to refrain the press rods 5 from bouncing up owing to pressure of flowing liquid in pipe or external vibration. When detaching the connectors 3, 10, the user has to push the press portion 6 to squeeze the spring 92, so that the latch 91 will be released from the circular hole 412 and the press rods 5 can be pulled up to drive the stopper 9 to slide along inner wall of the flange 41 a following movement of the press rods 5.

In comparison with prior skill, the improved structure of a quick coupling of this invention is benefited with merits:

1. When two connectors are combined, a stopper in the press rod will insert in a circular hole of a flange to set the press rod fixed at the main connecting body that refrains the press rod from bouncing up after a long-term period despite of pressure of flowing liquid in pipe or external vibration.

2. The consolidated joint cannot be detached easily in virtue of this invention.

Although, this invention has been described in terms of preferred embodiments, it is apparent that numerous variations and modifications may be made without departing from the true spirit and scope thereof, as set forth in the following claims.

What is claimed is:

1. A quick coupling mechanism comprising:

a main connecting body, each of two lateral sides of said main connecting body is extended to form a pair of flanges; aligned holes in each of said pair of flanges and one of said flanges on each lateral side having a hole therein parallel to said aligned holes and a hole transverse to and intersecting said parallel hole;

a press rod having an arced head at a front end, said arced head is provided with a hole and a receiving cavity;

a flange press portion with a groove therein;

a stopper, said stopper comprising a latch and a spring inserted in said receiving cavity at said front end of said press rod; wherein said press rod is situated between said flanges at each of said two lateral sides of said main connecting body, said hole in said press rod is aligned with said aligned holes in said flanges, and a pin passes through said hole in said press rod and said aligned holes in said flanges to movably secure said press rod to said main connecting body;

said flange press portion is inserted in said parallel hole in said flanges, and an insertion pin is inserted in said transverse hole and into said groove of said flange press portion to slidably secure said flange press portion in position; such that when said press rod is moved to a closed position, said receiving cavity and said parallel hole are aligned and said spring urges said stopper to a position such that said stopper moves partially out of said receiving cavity and into said parallel hole thereby prohibiting rotation of said press rod relative to said first flange, and when a user of said quick coupling mechanism wants to move said press rod to an open position, the user must depress said flange press portion so that said stopper is pushed out of said parallel hole thereby enabling the user to raise said press rod.

* * * * *